United States Patent [19]
Cherrick et al.

[11] Patent Number: 6,052,155
[45] Date of Patent: Apr. 18, 2000

[54] ONE KEY SYSTEM FOR FREEZING A TELEVISION PIP DISPLAY

[75] Inventors: Sol Cherrick, Chicago; Charles S. Pint, Evanston, both of Ill.

[73] Assignee: Zenith Electronics Corporation, Glenview, Ill.

[21] Appl. No.: 09/022,316

[22] Filed: Feb. 11, 1998

[51] Int. Cl.[7] ...................................................... H04N 5/45
[52] U.S. Cl. ........................ 348/565; 348/559; 348/734
[58] Field of Search ..................................... 348/565, 564, 348/734, 559, 560, 563, 566, 569, 581, 582; H04N 5/45, 5/445

[56] References Cited

U.S. PATENT DOCUMENTS 5,751,373 5/1998 Ohyama .................................. 348/569

*Primary Examiner*—Sherrie Hsia

[57] ABSTRACT

A television receiver with PIP circuitry provides a snapshot feature for freezing the main video display in the PIP display inset by operation of a special key on a remote control keypad. With the television receiver operating normally (PIP deactivated), one operation of the special key switches the main video signal to the PIP input and freezes the PIP display in its largest size and in the position it occupied the last time PIP was activated. A video message informs the viewer that a snapshot feature is operational. A subsequent operation of the special key switches the PIP signal to the PIP circuitry and unfreezes the display as in normal PIP operation. A further operation of the special key deactivates the PIP circuitry.

17 Claims, 2 Drawing Sheets

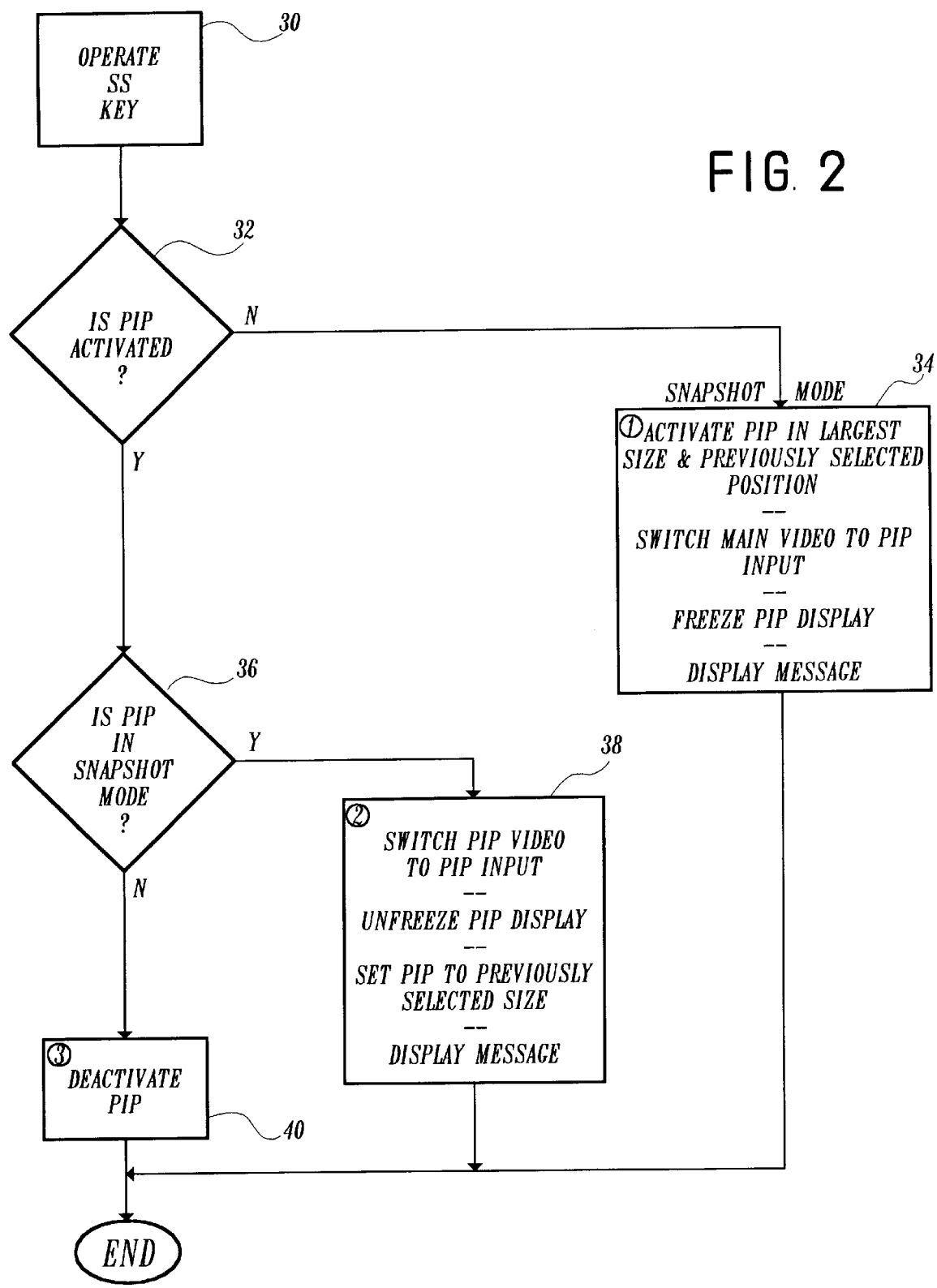

ONE KEY SYSTEM FOR FREEZING A TELEVISION PIP DISPLAY

BACKGROUND OF THE INVENTION AND PRIOR ART

This invention relates to PIP (picture-in-picture) arrangements in television receivers and in particular to the use of the PIP circuitry to enable a fast, simple one key operation for freezing the frame of video that is currently being displayed.

In many instances, it is desirable to be able to "freeze" or "take a snapshot" of the video being displayed on the viewing screen of a television receiver. This feature is especially valuable when the display includes textual material or a telephone number that the viewer wishes to carefully read, or otherwise take further note of The PIP circuitry has been used to freeze the video being displayed, albeit in a cumbersome manner that requires operation of multiple keys on a remote control keypad. Some systems only freeze the PIP display, which is accomplished by operating a freeze button, for example, while the PIP circuitry is activated. Since the PIP display is generally viewed on a monitoring basis, there is rarely a desire to freeze its display. Even then, the frozen video display is likely to be too small to be useful, since as mentioned, the PIP picture is generally used for monitoring and is most likely to be a small display to minimize any distraction from the main television picture. To obtain a useful size frozen picture or snapshot, the viewer would need to expand the PIP display to one of the larger sizes, which involves additional key operations as well as loss of time. There is also the likelihood that the main video display that the viewer desires to freeze will have changed by then.

One prior art system enables the main screen video to be frozen in a PIP display by depressing a freeze key when PIP is not active. The system operates to change the source inputs established by the viewer, e.g., antenna/cable to main input and VCR to PIP input, so that the antenna/cable is connected to the PIP input. The frozen PIP display is removed by operating the PIP button. Not only are two different buttons required in the sequence, but the viewer must return to the setup menu and change the PIP input to VCR to revert to the PIP operation that was established before the freeze button was operated. (Failure to change the PIP input setting results in the main picture being replicated in the PIP display.) On the other hand, if the freeze button is depressed when normal PIP is operating, the normal PIP display is frozen. The arrangement causes viewer confusion since different things happen when the freeze key is operated, depending upon the PIP operating condition, and also since multiple keys are involved. Further, the PIP display size (with the frozen main picture) corresponds to the display size of the PIP the last time it was activated, which most likely is the smallest size PIP available.

As is readily seen from the above, the prior art has many limitations in enabling a viewer to simply and quickly freeze or take a snapshot of the main video display currently being viewed. The invention provides a simple and low cost method of accomplishing this highly desirable end.

OBJECT OF THE INVENTION

A principal object of the invention is to provide a novel video freeze arrangement and method in a television receiver.

Another object of the invention is to provide a video freeze arrangement that is simple to operate.

A further object of the invention is to provide a video freeze arrangement in a PIP equipped television receiver that is instantly available to the viewer.

BRIEF DESCRIPTION OF THE DRAWINGS

These and other objects and advantages of the invention will be apparent upon reading the following description in conjunction with the drawings in which:

FIG. 2 is a flow chart illustrating the inventive method.

DESCRIPTION OF THE PREFERRED EMBODIMENT

Figure 1:
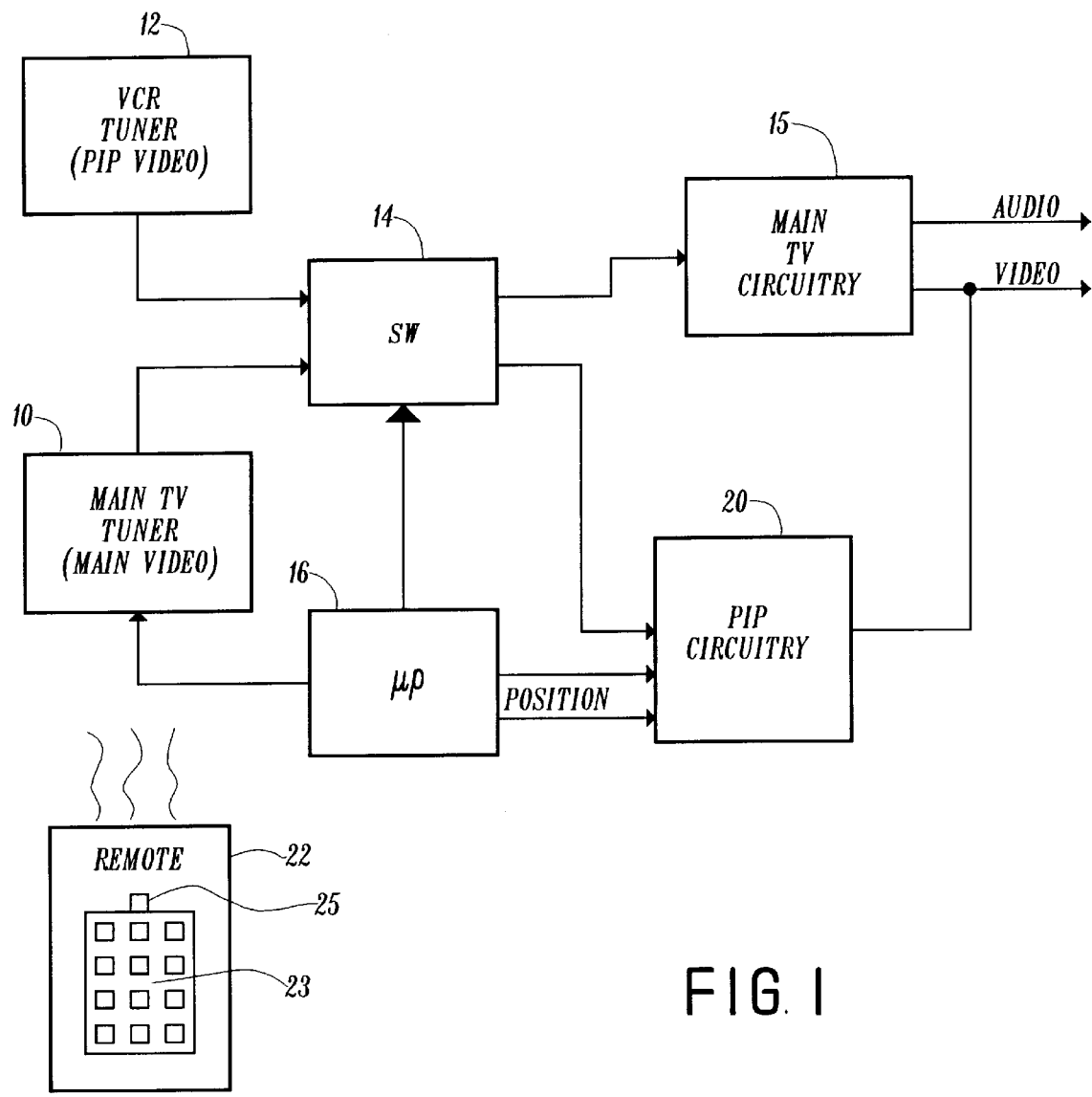
FIG. 1 is a simplified block diagram of a television receiver arranged to operate in accordance with the invention.

Referring to FIG. 1 of the drawings, a tuner 10 is indicated as being the source of the main television video signal. A VCR 12 includes a tuner that is indicated as being the source of the PIP video signal. Those skilled in the art will recognize that any video source may be the PIP video source and that the VCR is indicated only for convenience. The main video source 10 and the PIP video source 12 are supplied to a switch 14 that is under the control of a microprocessor 16, which also controls main video source 10 in a well-known manner. Switch 14 has one output that supplies a block 15, indicated as the main television circuitry and a block 20 indicated as comprising the PIP circuitry. Block 15 supplies an audio signal output and a video signal output that is combined with the output of PIP circuitry 20. Microprocessor 16 controls operation of the PIP circuitry and specifically controls the size of the PIP display and the position that the PIP display occupies as an inset of the main video display. A remote control unit 22 includes a keyboard 23 for controlling various functions of the television receiver and operation of the PIP circuitry. In accordance with the invention a special key 25 is provided on the remote control unit for enabling the snapshot feature of the invention. This feature, in summary, enables a viewer to freeze the picture on the main video display with a single operation of the special key 25. As will be seen from the flow diagram of FIG. 2, operation of the special key 25 when the television receiver is operating normally, i. e., with the PIP deactivated and with a normal video television signal being displayed, activates the PIP circuitry, switches the main video signal to the PIP input and freezes the PIP display in the largest PIP size to enable the viewer to take any desired further action with respect to the frozen video display. Referring to FIG. 2, step 30 indicates the initial operation of the snapshot key (special key). In the next step 32 a query is made as to whether PIP is activated. If not, as indicated by step 34, the Snapshot mode is entered. In this mode the system software: activates the PIP circuitry to generate a PIP display in its largest size and at the inset position occupied when the PIP circuitry was last activated; switches the main video to the PIP input; freezes the PIP display; and generates a visual message that the snapshot feature is operational. The circled number 1, indicates that this step is the result of the first special key operation. Since the main video signal is being inputted to the PIP circuitry, the frozen PIP display is that of the main video signal that the viewer was watching when the special key was operated. At this point the viewer may take whatever action desired with respect to the frozen PIP display. As mentioned, the snapshot feature is most useful when the viewer wishes to write down a telephone number or address that is displayed by the main video signal.

If the PIP was activated in step 32, a query is made in step 36, in response to a second or subsequent key operation, as to whether the Snapshot mode is active. If the Snapshot mode is active, in step 38 the software: switches the PIP video back to the PIP input; unfreezes the PIP display; sets the PIP display to the previously established size; and displays a suitable message indicating that normal PIP viewing is now taking place. If the PIP was not in the Snapshot mode in step 36, a subsequent or third operation of special key 25 in step 40 results in deactivation of the PIP circuitry and a return to normal television viewing.

It will be appreciated that the labelling of the operations of the special key as 1, 2 and 3 is arbitrary and merely for ease of description. In actuality, snapshot key (special key 25) operates in three different states. For example, if the PIP is active when the snapshot key is depressed, the PIP will be deactivated. A subsequent operation of the snapshot key will now activate the PIP and freeze the main video therein as indicated in step 34 of FIG. 2. If the PIP is in the snapshot mode (main picture frozen in the PIP display) when the snapshot key is depressed, the PIP display will be unfrozen and revert to the normal viewer-established parameters, i. e., previously established size and normal (VCR) input. This of course corresponds to normal PIP operation just discussed and a further operation of the special key 25 will deactivate the PIP. Therefore, the viewer need only operate a single key to run the gamut of active PIP, frozen main video in the PIP display and no PIP. Confusion is minimized since the special key 25 operates the same way all the time irrespective of the PIP state.

What has been described is a novel method and apparatus for enabling a fast simple freezing of the main video display of a television receiver in a PIP display inset by the operation of a single special key on a remote control unit. A subsequent operation of the same special key results in normal PIP operations with no alterations to the viewer established PIP parameters. A further operation of the special key deactivates the PIP circuitry. It is recognized that numerous changes in the described embodiment of the invention will occur to those skilled in the art without departing from its true spirit and scope. The invention is to be limited only as defined in the claims.

What is claimed is:

1. A method of operating a television receiver having PIP circuitry with a PIP input for producing a PIP display from a PIP video signal as an inset of a main video display comprising:

providing a special key on the keyboard of a remote control unit for the television receiver; and in response to one operation of the special key with the television receiver displaying a main video signal with the PIP circuitry deactivated:
   (a) activating the PIP circuitry in its largest display size;
   (b) temporarily switching the main video signal to the PIP input; and
   (c) freezing the PIP display.

2. The method of claim 1, further comprising positioning the PIP display in the same position the PIP display occupied the last time the PIP circuitry was activated.

3. The method of claim 2, further comprising displaying a message on the main video display indicating that a snapshot mode is operational.

4. The method of claim 1, further comprising:

in response to a subsequent operation of the special key:
   (d) unfreezing the PIP display; and
   (e) switching the PIP signal to the PIP input.

5. The method of claim 4, further comprising:

in response to a further operation of the special key:
   (f) deactivating the PIP circuitry.

6. In combination with a television receiver producing a main video display from a television display signal:

a remote control device having a keypad for issuing control signals for controlling said television receiver;

PIP means having a PIP input for developing a PIP display from a PIP signal, as an inset of said main video display, activation and deactivation of said PIP means and the display size and position of said PIP display being controlled by operation of corresponding keys on said remote control keypad;

a special key on said keypad; and snapshot means responsive to one operation of said special key for activating said PIP means with the largest display size of said PIP display, temporarily switching said main television display signal to said PIP input and freezing said PIP display.

7. The combination of claim 6, wherein said PIP means generates said PIP display in the same position as that occupied when said PIP means was last activated.

8. The combination of claim 6, further including means for generating a video message indicating a snapshot mode is in effect.

9. The combination of claim 6, wherein said snapshot means is responsive to a subsequent operation of said special key for switching said PIP signal to said PIP input, and for unfreezing said PIP display.

10. The combination of claim 9, wherein said snapshot means is responsive to a further operation of said special key to deactivate said PIP means.

11. In combination with a television receiver producing a main video display from a television display signal:

a remote control device having a keypad for issuing control signals for controlling said television receiver;

PIP means having a PIP input for developing a PIP display from a PIP signal as an inset of said main video display, activation and deactivation of said PIP means and the size and position of said PIP display being controlled by operation of corresponding keys on said remote control keypad;

a special key on said keypad;

snapshot means responsive to one operation of said special key for activating said PIP means with the largest size display of said PIP display, positioning said PIP display in the same position on said main video display that said PIP display occupied the last time said PIP means was activated, temporarily switching said main television display signal to said PIP input, freezing said PIP display and generating a video message indicating that a snapshot feature is operational.

12. The combination of claim 11, wherein said snapshot means is responsive to a subsequent operation of said special key to; switch said PIP signal to said PIP input; set the PIP display size to the size established before initiation of said snapshot feature and unfreeze said PIP display; and to a further operation of said special key, deactivate said PIP means.

13. A method of operating a television receiver having PIP circuitry for producing a PIP display from a PIP video signal as an inset of a main video display comprising:

providing a special key on the keyboard of a remote control unit for the television receiver; and in response to successive operations of the special key:

(a) activating the PIP circuitry with a frozen main display therein;
(b) producing the PIP display from the PIP video signal; and
(c) deactivating the PIP display.

14. A method of operating a television receiver having PIP circuitry for producing a PIP display from a PIP video signal as an inset of a main video display comprising:

providing a special key on the keyboard of a remote control unit for the television receiver;

activating the PIP circuitry with a frozen main video display therein in response to operation of the special key when the PIP circuitry is inactive; and deactivating the PIP circuitry in response to a subsequent operation of the special key so that, upon activation of the PIP circuitry with a PIP key, the PIP video signal is displayed in the PIP display.

15. In combination with a television receiver producing a main video display from a television display signal;

a remote control device having a keypad for issuing control signals for controlling said television receiver;

PIP means for developing a PIP display from a PIP signal as an inset of said main video signal display, activation and deactivation of said PIP means being controlled by operation of corresponding keys on said remote control keypad;

a special key on said keypad; and snapshot means responsive to operation of said special key:
(a) when said PIP means is inactive, for activating said PIP means with a frozen main video display; and
(b) when said PIP means is active and displaying a PIP signal, for deactivating said PIP means.

16. A method of operating a television receiver having PIP circuitry with a PIP input for producing a PIP display from a PIP video signal as an inset of a main video display comprising:

providing a special key on the keyboard of a remote control unit for the television receiver; and in response to operation of the special key with the television receiver displaying a main video signal with the PIP circuitry deactivated:
(a) activating the PIP circuitry;
(b) temporarily switching the main video signal to the PIP input; and
(c) freezing the PIP display.

17. In combination with a television receiver producing a main video display from a television display signal:

a remote control device having a keypad for issuing control signals for controlling said television receiver;

PIP means having a PIP input for developing a PIP display from a PIP signal, as an inset of said main video display, activation and deactivation of said PIP means and the size and position of said PIP display being controlled by operation of corresponding keys on said remote control keypad;

a special key on said keypad; and snapshot means responsive to operation of said special key for activating said PIP means, temporarily switching said main television display signal to said PIP input and freezing said PIP display.

* * * * *